US006391241B1

(12) United States Patent
Cote et al.

(10) Patent No.: US 6,391,241 B1
(45) **Date of Patent: *May 21, 2002**

(54) METHOD OF MANUFACTURE FOR A MULTIWELL PLATE AND/OR FILTER PLATE

(75) Inventors: Richard Alexander Cote, Boston; Gregory Mathus, Concord, both of MA (US); Alfred L. Michaelsen, Painted Post, NY (US)

(73) Assignee: Corning Incorporated, Corning, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/870,313

(22) Filed: Jun. 6, 1997

(51) Int. Cl.[7] ........................ B29C 45/14

(52) U.S. Cl. ........................ 264/153; 264/250; 264/255; 264/274; 264/275; 264/DIG. 48

(58) Field of Search ........................ 264/153, 255, 264/DIG. 48, 250, 274, 275

(56) References Cited

U.S. PATENT DOCUMENTS

| | | | | | |
|---|---|---|---|---|---|
| 3,319,792 A | | 5/1967 | Leder et al. | | |
| 3,990,852 A | | 11/1976 | Piazzi et al. | | 23/253 R |
| 4,090,850 A | | 5/1978 | Chen et al. | | 23/259 |
| 4,111,754 A | | 9/1978 | Park | | 195/127 |
| 4,304,865 A | | 12/1981 | O'Brien et al. | | 435/240 |
| 4,427,415 A | | 1/1984 | Cleveland | | 436/57 |
| 4,431,307 A | | 2/1984 | Suovaniemi | | 356/246 |
| 4,526,690 A | | 7/1985 | Kiovsky et al. | | 210/335 |
| 4,640,777 A | * | 2/1987 | Lemonnier | | 210/433.2 |
| 4,704,255 A | | 11/1987 | Jolley | | 422/101 |
| 4,734,192 A | | 3/1988 | Champion et al. | | 210/335 |
| 4,777,021 A | | 10/1988 | Wertz et al. | | 422/101 |
| 4,927,604 A | | 5/1990 | Mathus et al. | | 422/101 |
| 4,948,442 A | | 8/1990 | Manns | | 156/73.1 |
| 4,956,298 A | | 9/1990 | Diekmann | | 430/311 |
| 5,009,780 A | | 4/1991 | Sarrasin | | 210/238 |
| 5,047,215 A | * | 9/1991 | Manns | | 422/101 |
| 5,108,704 A | | 4/1992 | Bowers et al. | | 422/70 |
| 5,141,719 A | | 8/1992 | Fernwood et al. | | 422/101 |
| 5,223,133 A | | 6/1993 | Clark et al. | | 210/232 |
| 5,273,718 A | | 12/1993 | Skold et al. | | 422/101 |
| 5,294,795 A | | 3/1994 | Lehtinen et al. | | 250/328 |
| 5,319,436 A | | 6/1994 | Manns et al. | | 356/246 |
| 5,342,581 A | | 8/1994 | Sanadi | | 422/101 |
| 5,454,951 A | * | 10/1995 | Hoopman | | 210/650 |
| 5,457,527 A | | 10/1995 | Manns et al. | | 356/246 |
| 5,885,499 A | * | 3/1999 | Aksberg | | 264/153 |

* cited by examiner

*Primary Examiner*—Jan H. Silbaugh
*Assistant Examiner*—Edmund H. Lee
(74) *Attorney, Agent, or Firm*—Thomas R. Bell

(57) ABSTRACT

The invention provides for a method for the manufacture of multiwell plates and multiwell filter plates. The plates are the result of a two part construction in which individual filter discs are securely pinned between opposing plates, one of which is insert molded against the other.

3 Claims, 4 Drawing Sheets

METHOD OF MANUFACTURE FOR A MULTIWELL PLATE AND/OR FILTER PLATE

BACKGROUND OF THE INVENTION

The invention relates to a disposable multiwell filter apparatus for use in biological and biochemical assays that can be used and is compatible with existing equipment.

In pharmaceutical and biological research laboratories, plates with a multitude of wells have replaced traditional test tubes for assay and analysis. For many years, multi-well laboratory plates have been manufactured in configurations ranging from 1 well to 384 wells, and beyond. The wells of multi-well plates are typically used as reaction vessels in which various assays are performed. The types of analytical and diagnostic assays are numerous. The typical areas of use include cell culture, drug discovery research, immunology, and molecular biology, among others. Current industry standard multi-well plates are laid out with 96 wells in an 8×12 matrix (mutually perpendicular 8 and 12 well rows). In addition, the height, length and width of the 96-well plates are standardized. This standardization has resulted in the development of a large array of auxiliary equipment specifically developed for 96-well formats.

Many assays or tests require a mixture of particulate or cellular matter in a fluid medium. The mixture is then subjected to combination with reagents, separation steps and washing steps. The end product of such analysis is often a residue of solid matter which may be extracted for further analysis.

Separation of solids from fluid medium is often accomplished by filtration. The separation is accomplished in or on the filter material by passing the liquid through it. The liquid can be propelled through the membrane either by a pressure differential or by centrifugal force. Filter plates that conform to a 96 well standardized format are known as disclosed in U.S. Pat. Nos. 4,427,415 and 5,047,215. One significant problem that has been encountered with filter plates adapted for use with a 96 well plate is that cross contamination may occur between wells. When a unitary filter sheet is sandwiched between two pieces of plastic molded in a 96 well format, liquid from one well, upon wetting the filter material, may wick through the paper to neighboring wells thereby contaminating the sample contained within that well. One solution to this problem is offered in U.S. Pat. Nos. 4,948,442 and 5,047,215. In these patents, a 96 well filter plate is disclosed comprising a filter sheet placed between two plastic plates. One of the plates has a series of ridges that cut the filter sheet when the plates are ultrasonically welded together. By cutting the filter sheet around each well, the possibility of wicking between neighboring wells is effectively eliminated. A problem with this design is that it limits the product offering to membranes that can be cut by the process and to plate materials that can be ultrasonically welded. In fact, the potential for wicking and cross contamination still exists when the filter material is not completely severed in the welding process.

U.S. Pat. No. 4,427,415 discloses a filter plate of one piece construction having wells with drain holes in the bottom and capable of receiving filter discs into the wells. Wicking is obviously not a problem in this plate because individual filter discs are used as opposed to a unitary sheet of filter paper. The filter discs used in this plate are put into each well individually and are not secured to the bottom of the well. A danger exists with a filter disc that has not been secured down in that some liquid from the well could pass under the filter and thereby escape filtration, resulting in contamination of the filtrate.

Our invention solves several problems of prior art filter plate designs by providing a multiwell filter plate in which 1) filters are securely fastened to the plate without the use of glue or other potentially contaminant chemical adhesives, 2) an expansive variety of filter materials may be used, 3) a large number of thermoplastic components may be employed in its construction, and 4) no cross contamination through liquid wicking occurs between neighboring wells. The preferred embodiment of the present invention also offers a conical nozzle designed to cause exiting fluid to create droplets rather than lateral flow along the bottom of the plate. Further, a ring or skirt will preferably circumscribe the underside of each filter well. The skirt fits into a corresponding well of a receiver plate and is designed to prevent cross contamination that may otherwise occur by splashing of filtrate.

SUMMARY OF THE INVENTION

It is therefore an object of the present invention to provide a disposable filtration device for chemical and biological tests in which a large number of samples may be tested simultaneously. Further objects of the present invention are: to provide a filter plate that will be compatible with existing 96 well cluster plate formats as standardized by the industry; to provide a filter plate that can be handled by automated robotic assay equipment; to provide a filter plate having individual wells having a support grid on the bottom to help support the filter element, prevent tearing, and allow for an even distribution of filtered material on the filter; to provide a filter plate in which liquid from one well can not mix with liquid from a neighboring well (the filter plate of the present design prevents lateral flow or cross-talk of liquid through the membrane to other wells); to prevent cross contamination of filtrate after passing through the filter and passing to a receiver plate; to provide a filter plate of two part construction in which each individual well filter is securely pinned between opposing plates that are insert molded against each other; and to provide a unique method for the manufacture of filter plates.

Briefly, the present invention relates to an improved filter plate and its method of manufacture. The filter plate is a two part construction. It comprises a well plate preferably with 96 wells, each well being open on both ends, molded against a harvester plate insert preferably having 96 counter-bores, each containing a filter disc, whereby each counter-bore aligns with a corresponding and respective well from the well plate, and whereby the diameter of the counter-bore is greater than the diameter of the well, such that the well bonds with the outer rim of the counterbore thereby creating a lap joint. The lap joint also serves the purpose of fixing the filter disc securely to the insert without the need for glue or chemical adhesives. During the injection molding process, extremely high pressures in the mold ensure that the edges of the filter disc are pressed against the insert.

The assembled filter plate product has a plurality of interconnected wells of uniform diameter, each well being defined by a circular side wall, each of the side walls being interconnected to the side wall of at least two adjacent wells, each of the wells being open at one end. Further, the plate has a bottom wall at the bottom of each of the wells, which is connected to the side wall, each of the bottom walls having an opening therein. A conical drainage nozzle having an external surface and an internal passage communicating with the opening in the bottom wall, extends downwardly from the bottom wall from a point radially inward from the side wall. Finally, a filter disc is positioned on top of the bottom walls of the wells, the peripheries of each filter being sandwiched between a bottom portion of the side wall of each well and a top portion of the bottom wall of each well. The bottom walls have an opening therein, the opening preferably taking the form of a funnel shaped nozzle. A support grid preferably extends across the opening in order to provide support for the filter disc.

The method of manufacturing the plate comprises several steps, namely: forming an insert having a plurality of counter-bores; punching filter discs into the bottom surface of the counter-bore; and insert molding a well plate against the insert and filters such that wells from the well plate align with corresponding counter-bores from the insert thereby forming a lap joint that effectively secures the filter disc in place. The method can be extended for use in the manufacture of multiwell plates which do not have a filter, but require a well bottom of a different material than the side walls.

DESCRIPTION OF THE PREFERRED EMBODIMENTS

Figure 1:
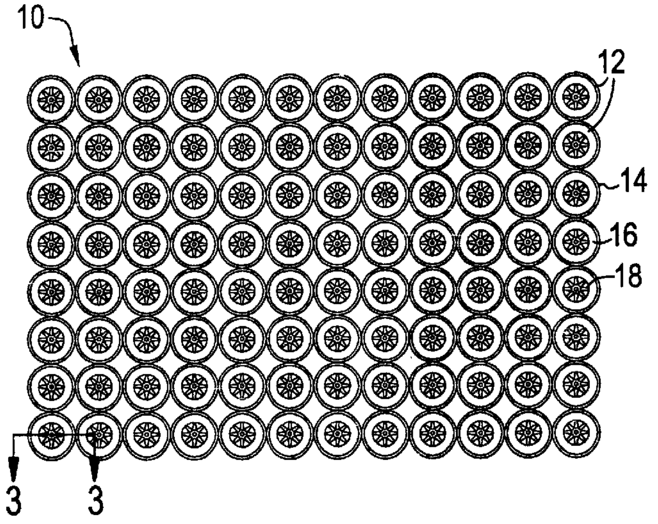
FIG. 1 is a plan view of the insert of the present invention.

Shown in FIG. 1 is an insert 10 of the present invention. The term insert is defined as a harvester plate capable of holding filter elements. The insert 10 is molded of a preferably hydrophobic thermoplastic material and preferably has 96 separate and distinct counter-bores 12 within it. Ideally, the spacings from the center point of each counter-bore 12 will conform to spacings between the centers of wells of the industry standardized 96 well cluster plate. Each counter-bore 12 has an annular lip or rim 14 around its outer periphery. The individual counter-bores 12 are joined together by adjoining the peripheries of adjacent counter-bores. Within the periphery of the rim 14, each counter-bore has a substantially flat bottom wall 16 capable of seating a filter disc and a depressed center area that forms the conical drain funnel 25. Further, each counter-bore preferably has a support grid 18 partially covering the drain hole, provided to prevent filter material that is seated on the flat bottom wall 16 of a counterbore from tearing during filtration while maximizing the open filter area for fluid flow.

Figure 2:
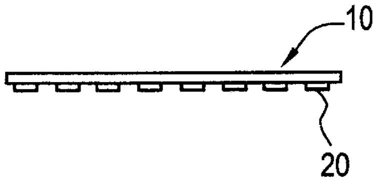
FIG. 2 is a side view of the insert of the present invention.

FIG. 2 shows a side view of the insert of the present invention. Each counter-bore has a funnel shaped drain hole therethrough. Preferably, below the flat surface area of the counterbore, is an annular skirt 20. The annular skirt serves two functions. First, the annular skirt 20 serves as a guidance system when aligning the filter plate with a 96 well receiving plate. The skirt 20 fits into a corresponding well in the 96 well plate into which filtrate is to be transferred. Any lateral movement of the filter plate, once engaged with the receiving plate, is repressed by the plurality of skirts sitting in the respective wells of the receiver plate. Second, the skirt 20 serves to minimize any contamination between wells of a receiver plate by guarding against aerosols or splashing of liquid filtrate as it transfers into the receiver plate.

Figure 3:
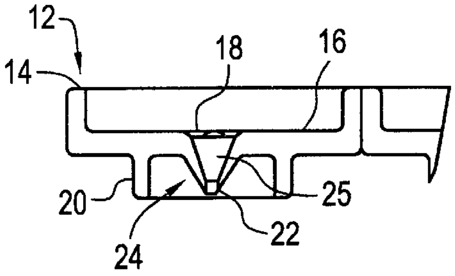
FIG. 3 is a fragmentary cross sectional view of the insert of FIG. 1, taken along the section line 3—3 in FIG. 1.

FIG. 3 shows a cross sectional view of one counter-bore 12 from an insert of the present invention. The counter-bore has a substantially flat bottom wall 16 to support a filter disc, an annular rim 14 around the periphery, a grid support 18, an annular skirt 20 and a conical nozzle serving as a drain hole 22 and extending downwardly from the bottom wall 16, preferably terminating at a point above the termination point of the skirt. The nozzle has an external surface 24, and an internal passage 25 that communicates with the bottom wall 16 of the counterbore 12. The internal passage 25 is preferably funnel shaped. The opening or drain hole 22 in the nozzle, where the internal passage 25 and external surface 24 of the nozzle meet, will preferably be quite small relative to the diameter of the bottom surface of the counter-bore. The small diameter and material surface energy are intended to keep the contents of a filter well from flowing until a significant driving force is applied. The conical external surface 24 of the nozzle is designed so that its surface intersects the internal passage 25 to form a sharp edge. The purpose of the sharp edge is to cause the draining fluid to form a droplet, rather than to allow flow laterally to any adjacent well thereby causing fluid cross-contamination of the filtrate along the under surface of the insert portion of the filter plate. Additionally, the edge will cause smaller droplets to form at the opening than would otherwise form without an edge. Ideally, a chamfered edge will be provided on the bottom of the skirt (not shown). The purpose of this chamfer is to guide the filter plate into the correct location over the receiver plate. This design is intended to make the plate easy to handle by a robotic placement system.

Figure 4:
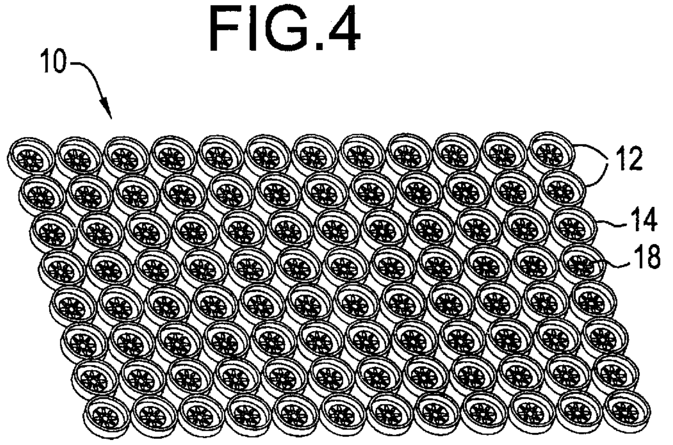
FIG. 4 is a three dimensional view of the insert of the present invention.
Figure 5:
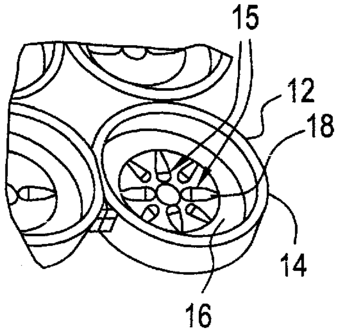
FIG. 5 is an enlarged view of the corner of the insert of FIG. 4.

FIGS. 4 and 5 show the insert 10 from above and in a three-dimensional view. The insert 10 contains a matrix of counter-bores 12 based upon the standard 96-well standard plate. Each counterbore 12 has an annular rim 14 around its periphery. A grid system 18 provides support over each drain hole. The grid system is comprised of a series of molded supports 15 that extend across the opening in the bottom wall 16 of the counterbore 12. The supports 15 extend across the internal passage 25 of the nozzle, are attached to the walls of the internal passage and project upward to a plane normal the top surface of the bottom wall of the counterbore. The grid system creates a substantially flat surface entirely across the bottom wall of the counterbore. The bottom wall is therefore able to provide support for a filter disc, and prevent any tearing of the disc, while still allowing filtrate to be drawn into the funnel shaped passage. The grid system further allows liquid to be drawn through the filter disc from a greater surface area than the prior art devices. This creates a more uniform distribution of filtered material on the disc and allows for a smoother flow of liquid through the plate.

Figure 6A:
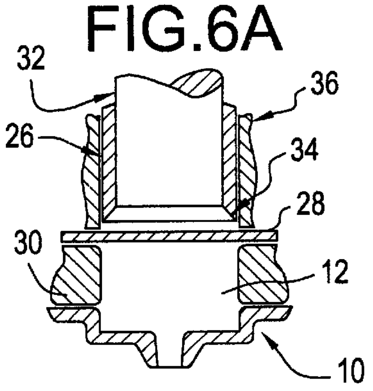
FIGS. 6A–6C are cross sectional views of a three step process for punching filter discs from a unitary sheet of filter paper, and inserting the discs into the insert.
Figure 6B:
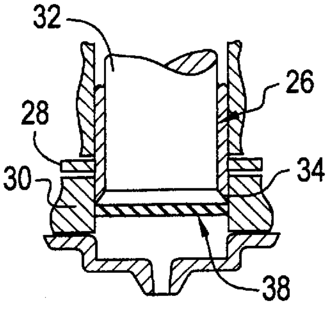
Figure 6C:
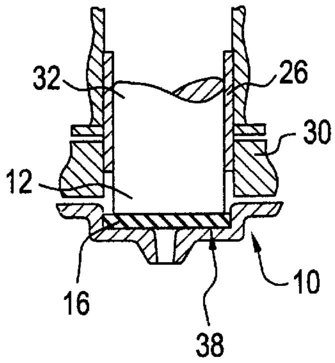

FIGS. 6A–6C show the process of punching and inserting a filter disc into a counterbore of the insert. A molded insert 10 is placed within a punch machine preferably having 96 punches 26 sized to cut membranes that will fit into the corresponding 96 counter-bores 12 of the insert. A filter sheet 28 of the desired material is placed between the insert 10 and the punch mechanism 26. A series of aligned bores 30 from the die side of the punch will be placed between the filter sheet 28 and each counter-bore 12 of the insert. The insertion of the filter discs preferably takes place in a two step process, first a punch, then an insertion.

For clarity, FIG. 6A shows only a single counter-bore 12. A bore 30 preferably made of hardened steel is located between the counter-bore 12 and a filter sheet 28. Positioned above the filter sheet 28 is a cylindrical plunger 32. The plunger 32 has a bottom will and is surrounded by a cylindrical punch 26. The plunger 32 is slideably mounted within the punch 26. The punch 26 terminates at its base in a radial cutting edge 34. The punch and plunger together make up a punch unit and are surrounded by a sleeve 36. The outer diameter of the punch 26 is approximately the same as the inner diameter of the bore 30 such that the punch fits snugly into the bore. The diameter of the bore 30 is approximately identical to the diameter of the counter-bore 12. FIG. 6B shows the plunger 32 having been thrust downward into the bore 30. The cutting edge 34 of the punch has severed the filter sheet 28 such that a filter disc 38 has been cut and pushed into the bore 30. In FIG. 6C, the punch 26 has stopped extending into the bore 30, while the plunger 32 has continued pushing the filter disc 38 down into the counter-bore 12 and against its bottom wall 16. The plunger 32 and the punch 26 are then retracted, leaving an insert 10 having a filter disk 38 positioned along the bottom wall 16 of the counterbore 12. Of course, it will be appreciated that as indicated, the described sequence will be performed simultaneously on a multiplicity of wells, e.g. 96 wells. The counterbore 12 as shown in FIGS. 6A–6C is only one from a matrix of counterbores making up an insert 10. Further, bore 30 is only one bore from a die having a matrix of bores that positionally align with the insert. Likewise, the punch unit comprising a plunger 32 surrounded by a cylindrical punch 26, is one of a matrix of punch units that positionally align with individual bores of the bore plate and individual counterbores of the insert. Preferably, sleeve 36, which is one sleeve from a precision carrier or guide plate, will encapsulate each punch unit as a protective measure.

Figure 7A:
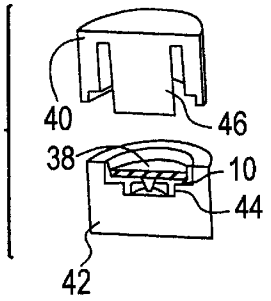
FIGS. 7A–7D are cross sectional three dimensional views of the molding process of the current invention whereby a well plate is molded against an insert.
Figure 7B:
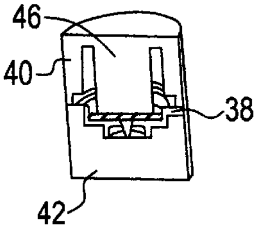
Figure 7C:
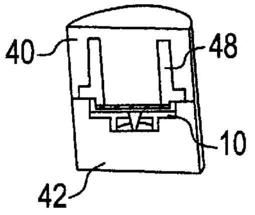
Figure 7D:
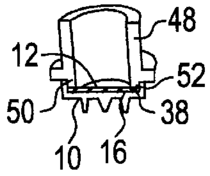
Figure 8A:
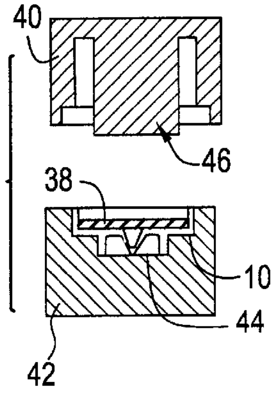
FIGS. 8A–8D are cross sectional two dimensional views of the molding process shown in FIG. 7.
Figure 8B:
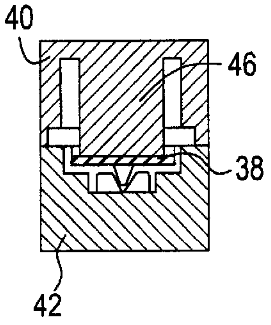
Figure 8C:
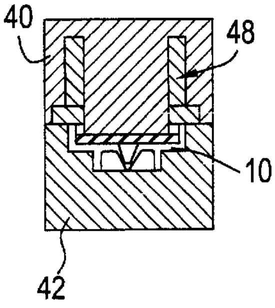
Figure 8D:
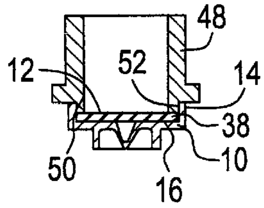

FIGS. 7A–7D and FIGS. 8A–8D show the insert molding technique that may be employed to obtain the filter plate of the present invention. FIGS. 7A–7D show the molding technique of one filter well, a portion of a plate of preferably 96 interconnected filter wells, in three-dimensional view. FIGS. 8A–8D show the same steps in cross sectional views. The mold which will accept this insert will have a cavity geometry that will form a standard 96 well plate against the insert, with the insert forming the bottom of the plate. The mold of FIG. 7A has two parts, an upper mold 40 and a lower mold 42. The lower mold 42 is designed to form a nest 44 for the pre-molded insert 10, as well as create external molded surfaces of the finished part. The upper mold 40 has a set of 96 core pins 46 that serve both to form the inside surfaces of the wells and to protect and hold each filter disc 38 in place while the material flows into the mold. The diameter of the core pins 46 are preferably smaller than the diameter of the filter discs 38 so that, when the mold closes, the outer edges of the filter discs will be exposed to the mold cavity and thus will also be exposed to material flowing into the mold. FIGS. 7B and 8B show the mold closed with the upper part 40 and lower part 42 of the mold pressed together. The core pin 46 is pressing the filter disc 38 in place. Material flows into the mold through a gate and flows across the cavity, thereby forming the well plate 48. The gate is located in such a position as to optimize mold flow. The formed well plate is a plate preferably having 96 wells that extend through the plate, each well having open ends on each of its top and bottom surfaces. FIGS. 7C and 8C show the mold after the thermoplastic material has filled the mold and formed the well plate 48. FIGS. 7D and 8D show the finished ware after it has been removed from the mold. The flange 56 would, of course, connect to corresponding flanges on adjacent wells. The well plate 48 contacts the filter disc 38 around the entire periphery of each well wall 50. The outer rim 14 of each counter-bore 12 and the lower wall 50 of each well actually bond together during the molding process and form lap joints 52 along their entire periphery. Anywhere the new material contacts the insert directly, the materials will be bonded. The well plate 48 and insert 10 are effectively bonded at each well along the lap joints 52. The well plate 48 is molded against the outer periphery of the filter disc 38 so as to position it securely against the bottom wall 16 of the insert 10. In some cases, depending on the membrane material, the filter disc 38 will bond to the material forming the well wall 50 thereby further securing the membrane in place.

The insert molding technique as described lends a further advantage over press fitting techniques or techniques that require ultrasonically welding two plates together. Thermoplastic materials have a tendency to change shape slightly upon cooling. Alignment between two separately molded parts can be compromised by this cooling process resulting, at times, in an improper fit between parts. However, in the present invention, since the well plate is molded against the insert, a reproducible dependable fit is guaranteed. Thereby, the fit between plates as described is inherently superior to a fit obtained by matching together two separately molded pieces.

Figure 9:
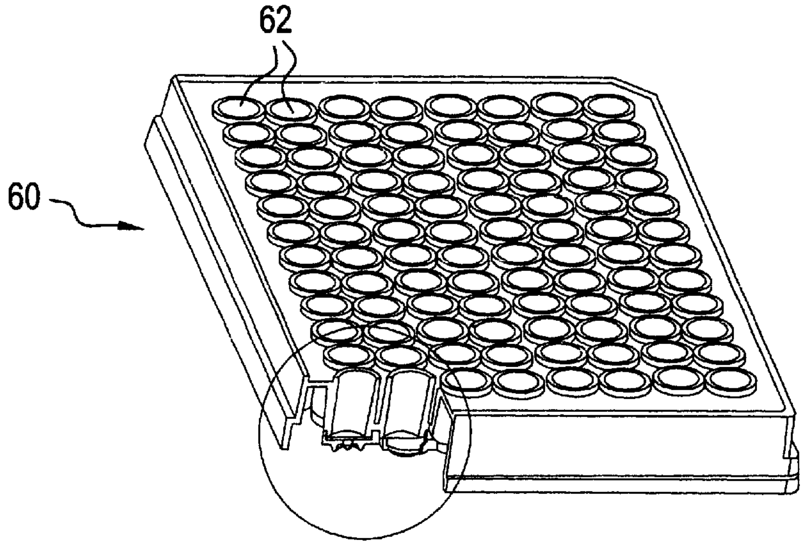
FIG. 9 is a multiwell filter plate of the present invention having a corner section extracted.
Figure 10:
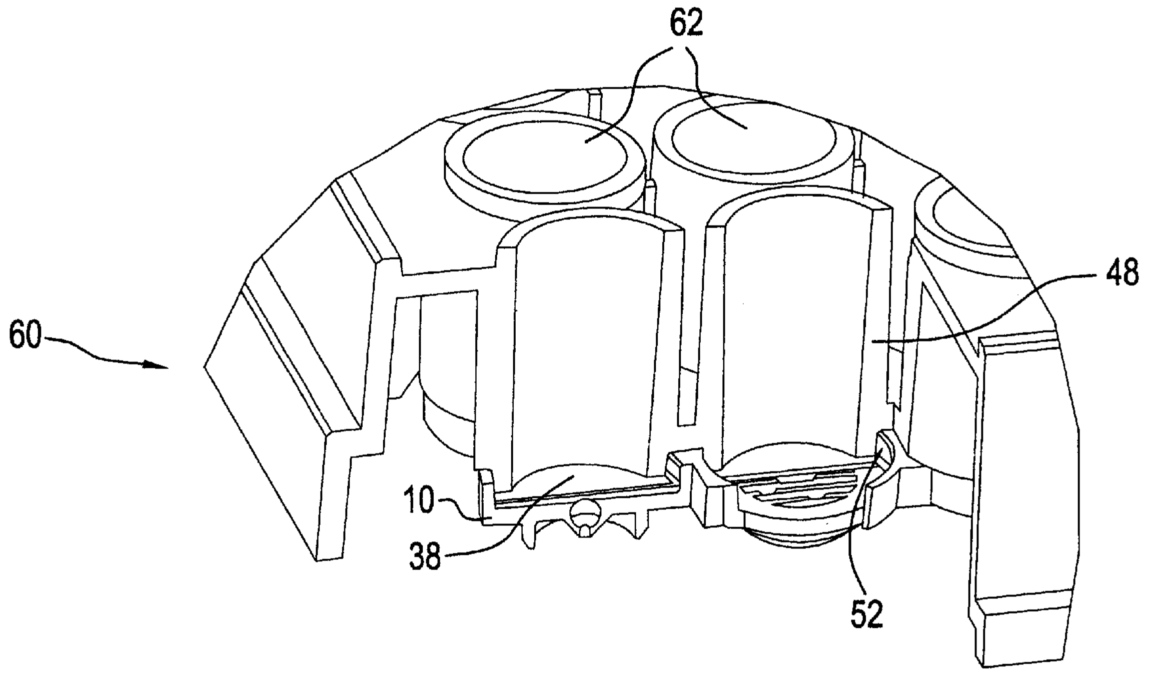
FIG. 10 is an enlargement of the corner of the multiwell filter plate of FIG. 9 showing a cross section of two adjacent wells.

Referring to FIG. 9 and 10, the resultant filter plate 60 has a plurality of wells 62 arranged in an 8×12 matrix. Each individual well is separated from the other, each containing a separate filter disc 38. No wicking or cross contamination between wells 62 in the filter plate 60 is possible because filter discs 38 are cut from the filter sheet before molding, not as part of the molding process. Each individual well is sealed from neighboring wells and no liquid transfer is possible through the overlapping and material bonded joint 52 formed between the well plate 48 and the insert 10.

It should be noted that the process for manufacturing filter plates can also be employed in the manufacture of 1×N well filter strips or individual filters. Further, filter plates can have wells of any number, for example 384 wells arranged in a 16×24 matrix.

It should also be noted that the process for manufacturing filter plates is not limited to wells that have a circular cross section. The counterbores of the insert and wells of the well plate may be oval, square, rectangular, etc. The discs that are punched from the sheet of material will, of course correspond to the shape of the well and therefore likewise may be oval, square, rectangular, etc. as punched from an accordingly shaped punch unit.

Figure 11:
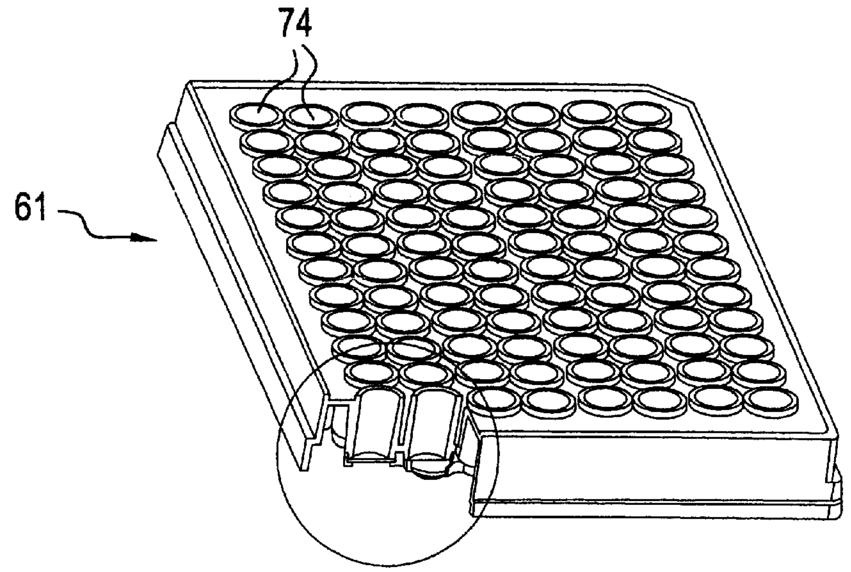
FIG. 11 is a multiwell plate of the present invention having a corner section extracted.
Figure 12:
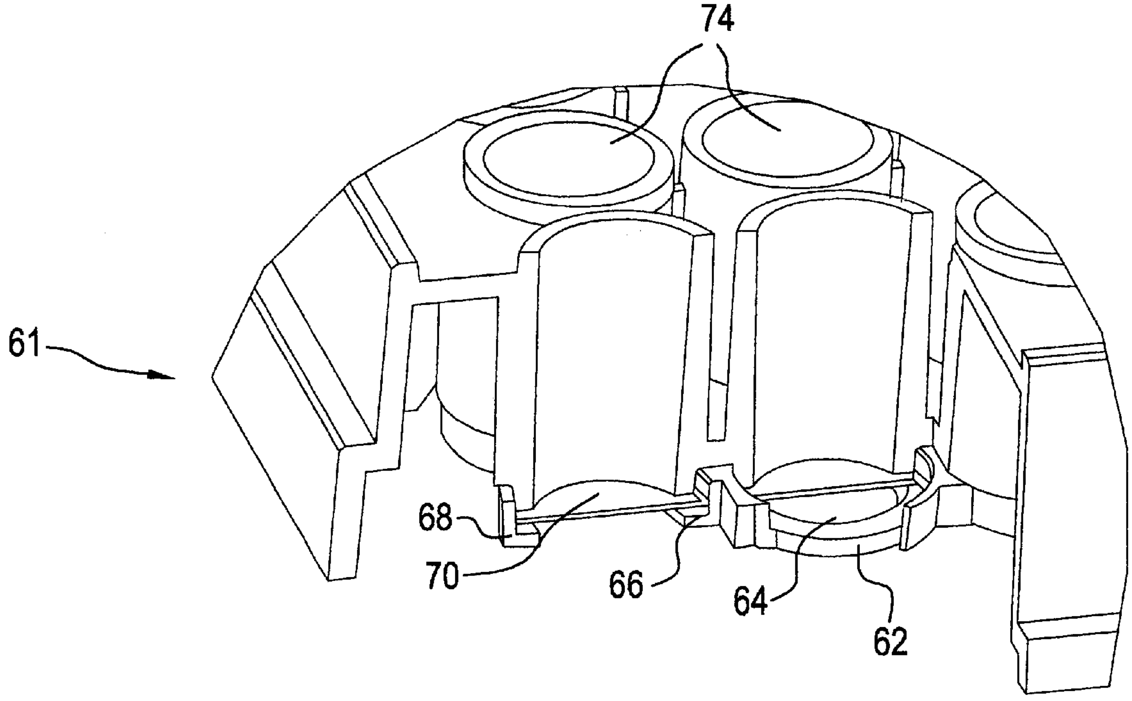
FIG. 12 is an enlargement of the corner of the multiwell plate of FIG. 9 showing a cross section of two adjacent wells.

The process for manufacturing filter plates can also be employed for producing other plates that require a well bottom of a different material than the side walls. For example, for the production of a multiwell plate having wells having opaque side walls and transparent bottoms, a transparent sheet or film such as a fluoropolymer film, may be substituted for the filter membrane material herein before described. In this embodiment and referring to FIGS. 11 and 12, the insert 60 consists of a molded support having a matrix of rings 62 corresponding to the desired multiwell plate 61. The rings 62, instead of having funnel shaped nozzles extending downwardly from the insert as described in the filter plate manufacturing process, are open throughout the center 64. Each ring 62 preferably has a flat support portion 66 in a plane parallel to the plane of the insert 60, and a substantially perpendicular annular rim 68 circumscribing the outer periphery of the flat support portion 66. The film is then punched by the method previously discussed, and individual discs of the film material are placed against the flat support portion of the ring of the insert. The punch mechanism is preferably sized such that a punched disk of transparent film will be supported by the flat portion and will fit against the annular rim. A well plate is then molded against the insert as previously described. The material of each annular rim bonds with the material of the well plate and each disc of transparent film is pinned between the flat support portion of each ring and the wall of each well. The resultant plate has wells 74 with bottoms 70 consisting of the transparent film material and sidewalls 72 of a different material, for example, opaque polystyrene. Punching individual discs from the transparent sheet also serves the purpose of preventing optical crosstalk between wells that might otherwise occur through a unitary sheet. The rings 62 of the insert may also be opaque and extend below the surface of the well bottom 70, thereby further preventing optical crosstalk between the wells 74.

Although preferred embodiments of the invention have been disclosed, other embodiments may be perceived without departing from the scope of the invention, as defined by the appended claims.

What is claimed is:

1. A method of making a filter plate comprising the steps of:

a) molding an insert having a matrix of interconnected counterbores, each counterbore having a bottom wall, an outer rim of predetermined diameter extending upwardly from said bottom wall, and an opening therethrough;

b) positioning a filter disc in each of said counterbores such that said filter disc rests upon the top surface of said bottom wall;

c) molding a well plate against said insert, said well plate having a top and bottom wall having a matrix of wells of predetermined diameter extending through said plate, each said well having open ends at each of said top and bottom wall, each said well having lower a wall, and whereby said matrix of counterbores corresponds with said matrix of wells such that each said lower wall aligns with a corresponding counterbore, whereby an outer diameter of each said lower wall is less than an inner diameter of said outer rim of each said corresponding counterbore, whereby said lower wall fits inside the rim of said corresponding counterbore thereby forming a lap joint between each said counterbore and said lower wall, and whereby said lower wall compresses said filter disc against said bottom wall of said counterbore thereby securing said filter disc in place.

2. A method of making a multiwell plate comprising the steps of:

a) providing a molded insert plate of interconnected rings, each ring having a predetermined diameter, a substantially flat portion, and an annular rim extending upwardly from said flat portion;

b) placing on said insert plate, a die having a matrix of bores, each bore having a diameter of said ring and arranged such that each bore positionally aligns with a corresponding ring from said plate of rings;

c) covering said die with a sheet of material;

d) positioning above said material, a matrix of punch units, each unit positionally aligned with a corresponding bore from said die, each unit comprising a plunger slidably mounted within a cylindrical punch, each punch having a radial cutting bottom edge extending beyond said plunger, each said unit having an outer diameter substantially identical to said diameter of said corresponding bore such that each unit is capable of fitting securely into said corresponding bore;

e) depressing said matrix of punch units through said material thereby cutting a disc from said material at each said cutting edge and such that a bottom surface of said plunger contacts said disc, said matrix of punch units extending into each said bore such that each said punch unit is at least partially contained within said corresponding bore;

f) extending each said plunger and attached disc into contact with each flat portion of said ring of said insert while each said punch remains contained within said bore;

g) depositing each said disc on said flat portion of each respective ring;

h) removing each said punch unit from each said bore; and molding a well plate having matrix of open ended wells corresponding in size and location to said rings, against said insert such that each well fits securely within the annular rim of each corresponding ring whereby an outer diameter of each said well is less than an inner diameter of said annular rim of said corresponding ring, thereby forming a lap joint between each said well and each said rim.

3. A method of making a multiwell plate comprising the steps of:

a) molding an insert having interconnected matrix of rings, each ring having a substantially flat support surface and an outer rim of predetermined diameter;

b) punching individual discs from a sheet and pushing said discs into contact with said support surface of a corresponding ring such that said disc substantially covers the entire opening of said ring; and c) molding a well plate against said insert, said well plate having a top and bottom wall having a matrix of wells of predetermined diameter extending through said plate, each well having open ends at each of said top and bottom wall, said matrix of rings corresponding with said matrix of wells such that each said well aligns with a corresponding ring whereby said well fits inside the rim of said ring thereby forming a lap joint between each said ring and said well, and whereby said well compresses said disk against said support surface of said ring thereby securing said disc in place.

* * * * *